United States Patent [19]

Harrington et al.

[11] Patent Number: 5,440,664
[45] Date of Patent: Aug. 8, 1995

[54] COHERENT, FLEXIBLE, COATED-BORE HOLLOW-FIBER WAVEGUIDE

[75] Inventors: James A. Harrington, Martinsville; Todd C. Abel, Lakewood; Jeffrey Hirsch, Princeton, all of N.J.

[73] Assignee: Rutgers, The State University of New Jersey, Piscataway, N.J.

[21] Appl. No.: 181,852

[22] Filed: Jan. 13, 1994

[51] Int. Cl.$^6$ .............................................. G02B 6/20
[52] U.S. Cl. ........................................ 385/125; 65/393
[58] Field of Search .......................... 385/125; 65/393

[56] References Cited

U.S. PATENT DOCUMENTS

| | | | |
|---|---|---|---|
| 4,453,803 | 6/1984 | Hidaka et al. | 385/125 |
| 4,652,083 | 3/1987 | Laakmann | 385/125 |
| 4,688,892 | 8/1987 | Laakmann | 385/125 |
| 4,688,893 | 8/1987 | Laakmann | 385/125 |
| 4,805,987 | 2/1989 | Laakmann et al. | 385/125 |
| 4,913,505 | 4/1990 | Levy | 350/96.1 |
| 4,930,863 | 6/1990 | Croitoriu et al. | 350/96.32 |
| 5,005,944 | 4/1991 | Laakmann et al. | 350/96.32 |
| 5,030,217 | 7/1991 | Harrington | 606/14 |
| 5,325,458 | 6/1994 | Morrow et al. | 385/125 |

*Primary Examiner*—Frank Gonzalez
*Attorney, Agent, or Firm*—Fish & Richardson

[57] ABSTRACT

A rugged flexible hollow-fiber waveguide that permits preservation of good transverse spatial coherence of input infrared laser radiation and that transmits substantial power of such radiation, with low attenuation. The present invention preferably comprises a small-diameter thin-wall silica-glass tube; a protective coating on the outer surface of the tube; a sufficient reflective layer on the inner surface of the tube; and a thickness, optimal for the wavelength(s) of interest, of dielectric on the exposed surface of the reflective layer.

8 Claims, 8 Drawing Sheets

COHERENT, FLEXIBLE, COATED-BORE HOLLOW-FIBER WAVEGUIDE

BACKGROUND OF THE INVENTION

1. Field of the Invention

This invention relates to waveguides for transmitting infrared radiation, and more particularly to a flexible hollow-fiber waveguide for transmitting mid-infrared radiation with low attenuation.

2. Description of Related Art

Radiation from visible, near-ultraviolet, and near-infrared lasers is transmitted well by simple, robust, inexpensive, nontoxic, solid oxide-glass fibers. However, a problem persists in devising a delivery system for transporting radiation from a mid-infrared laser to the point where application of that radiation is desired. Laser emissions at these wavelengths are not transmitted well by most solids. Whether the use be industrial or surgical, a satisfactory delivery system for mid-infrared should: (1) allow focal-spot sizes under 0.5 mm (preferably down to 0.1 mm) in diameter, at a reasonable working distance for the particular use, without requiring a large final optic; (2) transmit at least several tens of watts of average power, with low attenuation; (3) be easily maneuvered about an application site, with little resistance to motion and with minimal bulk to impair access to and viewing of the application site, and without substantial change in the output characteristics; and (4) be simple, robust, and relatively inexpensive. For surgical applications, the delivery system also must not itself be hazardous to the patient (such as are fibers containing toxic materials that are soluble in body fluids). It will be appreciated by those skilled in the art of laser application, that the requirements for good focusability and for unchanging output characteristics necessarily imply that the laser operate in the Gaussian or $TEM_{00}$ mode and that the delivery system not substantially degrade that mode.

For the laser wavelengths of immediate present interest (roughly, 2.5–12 $\mu$m), hitherto there has been no satisfactory delivery system. Articulated arms provide good beam quality and good transmission, but are awkward, complex, and expensive, and require frequent realignment. Solid fibers for this wavelength region provide poor beam quality and only fair transmission, are generally toxic, are expensive, and can be bent only a very limited number of times and to a rather limited degree. Accordingly, the art has attempted to use hollow waveguide fibers.

Prior-art hollow $n>1$ waveguides provide poor beam quality (poor transverse spatial coherence). FIG. 12B of Gregory & Harrington, and FIGS. 5 and 6 of Croitoru et al., "Characterization of hollow fibers for the transmission of infrared radiation", Appl. Opt. v. 29, 1805–1809 (20 Apr. 1990) and Dror et al., "Hollow Tubes for Transmitting IR Laser Energy for Surgery Applications", presented to ICALEO '89 (15–20 Jan., Los Angeles), are representative of the characteristics of prior art hollow $n>1$ waveguides. Such waveguides have only fair transmission. Typically, waveguides such as are disclosed in Matsuura & Miyagi, "Low-loss metallic hollow waveguides coated with durable and nontoxic ZnS", Appl. Phys. Lett. v. 61, 1622–1623 (5 Oct. 1992) are superior. Waveguides with metal tube walls which serve as the supporting structure for any coatings (such as disclosed in U.S. Pat. No. 5,005,944, issued to Laakman et al., and U.S. Pat. No. 4,913,505, issued to Levy '505) may be capable of handling substantial power, but are semiflexible at best. Those with plastic tube walls (such as disclosed in U.S. Pat. No. 4,930,863, issued to Croitoru et al.) are flexible, but have marginal power-handling capability at best, high loss, and lack coherence. As such they are suitable principally for signal-handling. Yet-earlier devices such as disclosed in U.S. Pat. No. 3,436,141, issued to Comte, U.S. Pat. No. 3,583,786, issued to Marcatili, and U.S. Pat. No. 3,963,828, issued to Onoda et al., have not proven useful for the applications of present interest at the wavelengths of present interest.

Hollow waveguide fibers having an index of refraction less than one, have not yet attained both transmission characteristics and flexibility required for many applications. However, in other respects these waveguide fibers are quite satisfactory at selected wavelengths. See Gregory & Harrington, "Attenuation, modal, and polarization properties of $n<1$, hollow dielectric waveguides", Appl. Opt. v. 32, 5302–5309 (20 Sept. 1993).

The present invention provides a waveguide, and method for making such waveguide, that meets the need for a flexible mid-infrared laser transmission medium which has relatively low loss and transmits the laser radiation without disruption of the $TEM_{00}$ mode.

SUMMARY OF THE INVENTION

The present invention is a flexible hollow-fiber waveguide and a method for making the waveguide. The waveguide can accept substantial average power (e.g., up to about 500 W) or pulse energy at or about a design wavelength in the spectral region from $<2$ $\mu$m to about 20 $\mu$m. The power/energy is input at the proximal end of the waveguide from a $TEM_{00}$ laser, and propagates with low attenuation in a nearly $HE_{11}$ fiber eigenmode to the distal end of the waveguide. At the distal end, the power/energy is emitted as if it were merely the continuation, without significant degradation, of the input $TEM_{00}$ eigenmode. In some embodiments of the present invention, the spatial profile may differ from that at the input.

The present invention is simple, robust, relatively inexpensive to make, and safe for use in medical/surgical applications. A fiber in accordance with the present invention can also accept visible light at its input and transmit a useful amount of that light through the bore and/or via the annular wall of the waveguide to the output for visual illumination and/or for assistance in aiming the infrared laser radiation.

The general embodiment of the device of the present invention comprises a hollow flexible tube having a bore less than approximately 2.5 millimeters and having a smooth internal surface. However, in the preferred embodiment, the bore is 0.5 millimeter. The tube is preferably a commercially available flexible, thin-wall, silica-glass tube, preferably with a protective sheath on the outer surface of the barrel to protect against abrasion and physical degradation. A layer of material that is optically reflective at mid-infrared wavelengths is deposited on the bore surface in such a way that the resulting bore is optically smooth at such wavelengths. A dielectric film is created or deposited on the exposed surface of the reflective layer in such a way that the resulting film is smooth at both the reflective layer interface and at the air interface, and such that the thickness of the dielectric film is appropriate to the design wavelength. The preferred embodiment, described below, uses silver as the reflective layer, and silver iodide as the dielectric. Other embodiments use metals (e.g., gold, copper, aluminum, nickel, platinum, molybdenum, and zinc) as the reflective layer and other dielectrics such as inorganic compounds (e.g., silver bromide and copper iodide, copper selenide, silver sulfide, zinc selenide, and zinc sulfide). It will be apparent from the background above, and from the description below, that the devices of the present invention preserve and maintain good input beam quality (good transverse spatial coherence), and hence are a qualitative improvement over the prior-art.

The invention also provides a method of making such devices, comprising the steps of: starting with a tube (such as a vitreous tube) having a smooth bore; plating the bore with a reflective layer using solutions and processes that do not degrade the bore's smoothness, and/or from which the reflective layer "levels" to a smooth reflective surface; and creating a dielectric film of the proper thickness on the exposed surface of the reflective layer, using solutions and processes that do not degrade the bore's smoothness.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
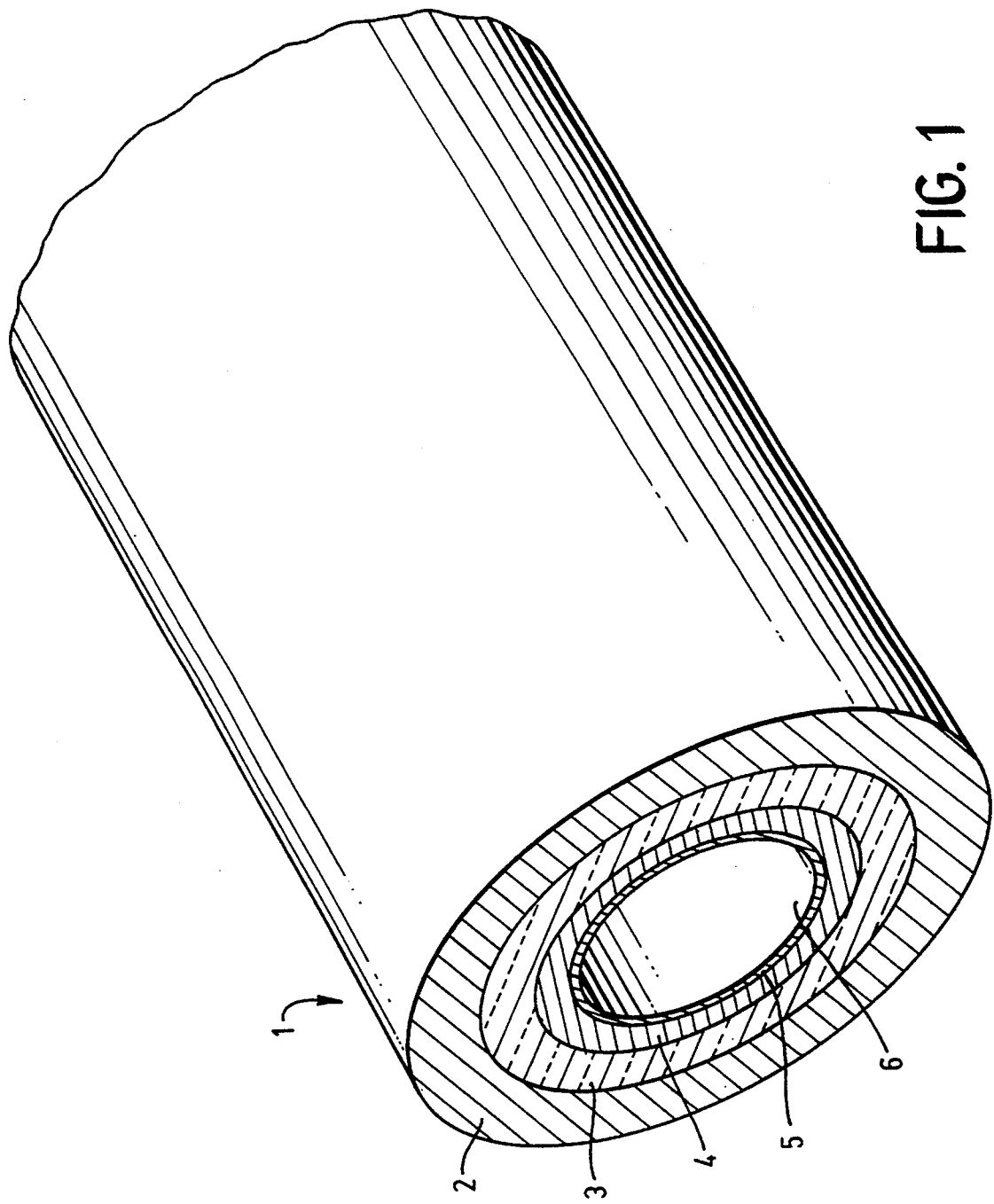
FIG. 1 is a schematic end view of an embodiment of the optical fiber according to the present invention, showing its construction.

FIG. 1 diagrammatically illustrates a hollow-fiber waveguide 1, constructed according to the preferred embodiment of the present invention for transmitting infrared radiation from both incoherent and coherent sources. A protective sheath 2 (which may be a polymer coating, polyimide, silicone/nylon, metal or other material) is preferably formed around or onto the outer surface of the barrel of a hollow-fiber waveguide having a smooth bore, such as a commercially available, thin-wall silica-glass tubing 3. A waveguide 1 of the present invention is preferably of such thickness as to be suited to applications such as carrying cutting radiation to tissue sites within a human body. As such, the tube 3 of the present invention must have an outer diameter that permits the waveguide to be flexible (i.e., easily bent to a radius of less than 10 cm). The sheath 2 preferably protects the tubing from abrasion and other mechanical degradation and seals against moisture and other substances that may physically degrade the tubing 3.

A reflective layer 4 is deposited onto the bore of the tubing 3 in such a way as to retain a smooth exterior surface for the reflective layer 4 or such that the reflective layer 4 "levels" to a smooth reflective surface. The reflective layer is preferably silver of less than 1 $\mu$m in thickness. However, in other embodiments the reflective layer may be of a different thickness. Furthermore, other embodiments may use metals (e.g., gold, copper, aluminum, platinum, molybdenum, zinc, and nickel) and semiconductors (e.g., germanium, etc.) as the reflective layer. A dielectric film 5 preferably having an index of refraction that is less than the index of refraction of the reflective layer 4, is fabricated or deposited (i.e., "created") on the bore of the reflective layer 4 in a manner that substantially retains or improves the smoothness of the exposed surface of the bore. The dielectric film 5 enhances the reflectively of the bore of the waveguide 1. The exact thickness of the dielectric film is determined by optical measurements and is carefully controlled to give the lowest loss at a particular infrared wavelength. Preferably, the dielectric film 5 is approximately 0.1 $\mu$m to 0.8 $\mu$m thick. In the preferred embodiment, the dielectric film is silver iodide. However, in other embodiments, the dielectric film may be inorganic compounds (e.g., silver bromide, copper iodide, copper selenide, silver sulfide, zinc selenide, and zinc sulfide).

The inner exposed surface of the dielectric film 5 defines a preferably hollow interior volume 6 of the waveguide 1, which may contain air, another gas or gaseous mixture, vacuum, or any other medium preferably having an index of refraction that is approximately equal to 1. The reflective layer 4 and the dielectric film are preferably thin and flexible so the final waveguide is essentially a flexible tube with special coatings deposited on the bore to produce a very low loss waveguide at infrared wavelengths. Waveguides in accordance with the present invention may be used to deliver high power (<500 Watts) infrared laser radiation for industrial welding, cutting, and heat treating. The present invention also finds use as broadband infrared fiber sensors operating from approximately 2.0 to 20 $\mu$m. In this role, the waveguides relay infrared signals to remote photo detectors. In particular, these waveguides could serve as the fiber optic link in remote spectroscopic and radiometric (thermometric) applications.

In the preferred embodiment, the internal diameter of the waveguide 1 prior to the application of the reflective layer 4, is from less than about 1.0 millimeter to about 100 microns, which provides good transmission characteristics, good mechanical flexibility, and is particularly suited for medical uses due to its small size.

In the preferred embodiment, the smoothness of the bore of the tubing 3 prior to finishing is about 0.05 microns or less. The finished waveguide preferably has a similar degree of smoothness. It has been found that such smoothness contributes substantially to the high performance characteristics of the present invention. This degree of smoothness can generally be attained only by glass or glass-like hollow-fiber tubes. However, the invention encompasses any flexible tubing capable of being made with this degree of smoothness.

The spatial profile of the laser beam that is output at the distal end of a waveguide made in accordance with the present invention depends upon the diameter of the bore of the waveguide, the purity of the input laser beam, and the bending radius of the waveguide. Generally, a smaller bore results in a purer mode. Thus, the spatial profile of the laser beam output at the distal end is more similar to the spatial profile of the laser beam input at the proximal end. This is due to the fact that a smaller bore causes higher loss for high-order modes than for lower-order modes. Waveguides having a relatively small bore (for example, approximately 1.0 mm) will best preserve the $TEM_{00}$ mode that is launched into the fiber at the proximal end of the waveguide.

Using the present invention, approximately 3-meter long hollow fibers can be made having very low attenuation, and high transverse spatial coherence for mid-infrared wavelengths from about 2.0 μm to about 20 μm.

EXAMPLE

The smooth-bore, thin-wall, silica-glass tubing 3 (preferably having a protective polymer sheath 2 on the outside) of the preferred embodiment of the present invention is available from several commercial sources (e.g., Fiberguide Industries of Stirling, N.J. and Polymicro Technologies of Phoenix, Ariz.). Glass is preferred because of its high power handling capability (e.g., up to about 500 watts of average power has been demonstrated). The embodiments of the present invention discussed herein have bore diameters of 700, 530, & 320 μm, but these are presented as exemplars and should not be construed as limiting. Such fibers have a bore smoothness of no more than about 0.05 microns. The fibers are preferably used as they are received from a commercial source. Accordingly, no etching procedure is used in the preferred embodiment of the present invention. The bore of the tubing 3 is plated with a reflective layer 4 (such as silver, gold, copper, aluminum, etc.) in a way that maintains the smoothness of the exposed surface of the reflective layer 4. This plating process is described in detail below. Next, a smooth dielectric film 5 (preferably of silver iodide), having a predetermined index of refraction and an optimal thickness for the design wavelength, is formed on the surface of the reflective layer 4. The combination and implementation of these things, in the manner detailed below, is the novel method of the present invention, and produces the novel fiber waveguide 1 of the present invention.

Pretreatment: Etching/Sensitizing/Activating

In one embodiment of the present invention in which silver coatings are used to form the reflective layer 4, the polymer-coated tubing 3 is used as received, with no pretreatment. Pretreatment appears to be part of the reason why prior-art hollow fibers have not been coherent, since such pretreatment appears to cause the surface of the substrate, and thus the surface of the reflective layer, to be pitted and otherwise coarse (on the scale of optical wavelengths). However, in alternative embodiments in which other metals, such as gold and copper, are used to form the reflective layer 4, pretreatments to the tubing 3 that are standard in the gold and copper coating arts may be required. Pretreatments may also be required before coating the tubing with metals other than silver, gold and copper.

Silver Solution

In accordance with one embodiment of the present invention, a silver solution is produced starting with approximately 1.15 g of 99.999%-pure silver nitrate ($AgNO_3$) dissolved in approximately 400 ml of distilled deionized water ($H_2O$). Aqueous ammonium hydroxide ($NH_4OH$; 15%) is added one drop at a time, causing a brown precipitate to form, and continuing until the solution is clear. A solution of approximately 0.22 g of sodium hydroxide (NaOH) in 100 ml of distilled water is then added to the silver-nitrate/ammonium-hydroxide solution, producing a thick brown precipitate. Ammonium hydroxide is then added one drop at a time until the solution turns clear.

Reducing Solution

A reducing solution is used which consists of approximately 22.5 ml of dextrose ($C_6H_{12}O_6$; 5% by weight in water) diluted to approximately 500 ml with distilled deionized water. Other such reducing solutions are well known in the art and may be used.

Silver Plating

The tubing 3 is preferably laid horizontal or vertical. The silver solution and the reducing solution are preferably combined in approximately equal amounts in a tee-fitting just prior to the inlet to the tubing 3. Depending upon the bore size of the waveguide to be made, as well as the target wavelength, the volume of solution used varies. For $CO_2$ laser wavelengths, a 700-μm-bore fiber uses approximately 500 ml/2 hrs each of each solution, whereas the 530-μm and 320-μm fibers each use approximately 100 ml/1 hr of each solution. For Er:YAG laser wavelengths, the 700-μm fiber uses approximately 100 ml/0.5 hr of each solution, and the 530-μm and 320-μm fibers each use approximately 50 ml/0.5 hr of each solution. The solutions are forced through the tubing 3 by increasing the pressure at the end of the tube 3 into which the solution enters, such as by a peristaltic pump, or by reducing the pressure at the opposite end of the tube, such as by a vacuum pump. The tubing 3, when horizontal, is preferably turned approximately 180 degrees on its long axis during plating to provide a more uniform coating. In addition or alternatively, the tube ends may be reversed in the middle of the plating procedure, or the solution may be forced through the tube 3 for a predetermined period of time, and subsequently pulled back through the tube 3 for another predetermined period of time, to facilitate more even plating. Furthermore, in accordance with one embodiment of the present invention, the solution may be recirculated for at least some portion of the time the solution flows through the tube 3. The plated tubing 3 is then preferably rinsed with a non-reactive rinsing solution, such as ethanol (ethyl alcohol; $CH_3CH_2OH$), and dried, such as by blowing with compressed air. The quantities of each solution and the rate at which each solution is forced through the bore have been determined empirically.

Iodization

In the preferred embodiment, a solution of approximately 100 ml of cyclohexane, to which 1 g of iodine is added, is mixed in a warm ultrasonic bath. The resulting solution is allowed to cool to approximately room temperature. A quantity of the resulting solution, which depends upon bore size, target wavelength, and type of pump used, is then measured out to form an optimal silver-iodide layer for lowest loss and diffraction-limited (i.e., spatially coherent or gaussian) output. For example, at $CO_2$ wavelengths, for a 700-$\mu$m fiber, approximately 22 ml/5 min. of the iodine/cyclohexane solution is preferably forced through the tubing 3 with a peristaltic pump, or approximately 50 ml/4.5 min. with a vacuum pump. For a 530-$\mu$m fiber, the preferred values are approximately 20 ml/4 min. with a peristaltic pump or approximately 50 ml/4 min. with a vacuum pump. For a 320-$\mu$m fiber, approximately 15 ml/3 min. is preferably used with a peristaltic pump (in this case, a vacuum pump cannot be used because the solution freezes inside the waveguide 1). At the Er:YAG wavelength, a 700-$\mu$m fiber preferably takes approximately 2.5 ml/0.5 min. of solution, using either pump. A 530-$\mu$m fiber preferably takes approximately 4 ml/1 min., using either pump. A 320-$\mu$m fiber, approximately 2.0 ml/0.5 min. is preferably used with a peristaltic pump. In each of the above cases, the pressure must be controlled so that the solution does not freeze. In any case, the resulting tubing 3 is preferably rinsed with a non-reactive rinsing solution, such as ethanol, and dried, such as by blowing with compressed air. The result is a completed waveguide 1. The foregoing should not be construed as limiting. For example, in one alternative embodiment, bromination is effective, and nonpolar solvents with negligible health effects other than cyclohexane may be useful.

DISCUSSION

Figure 2:
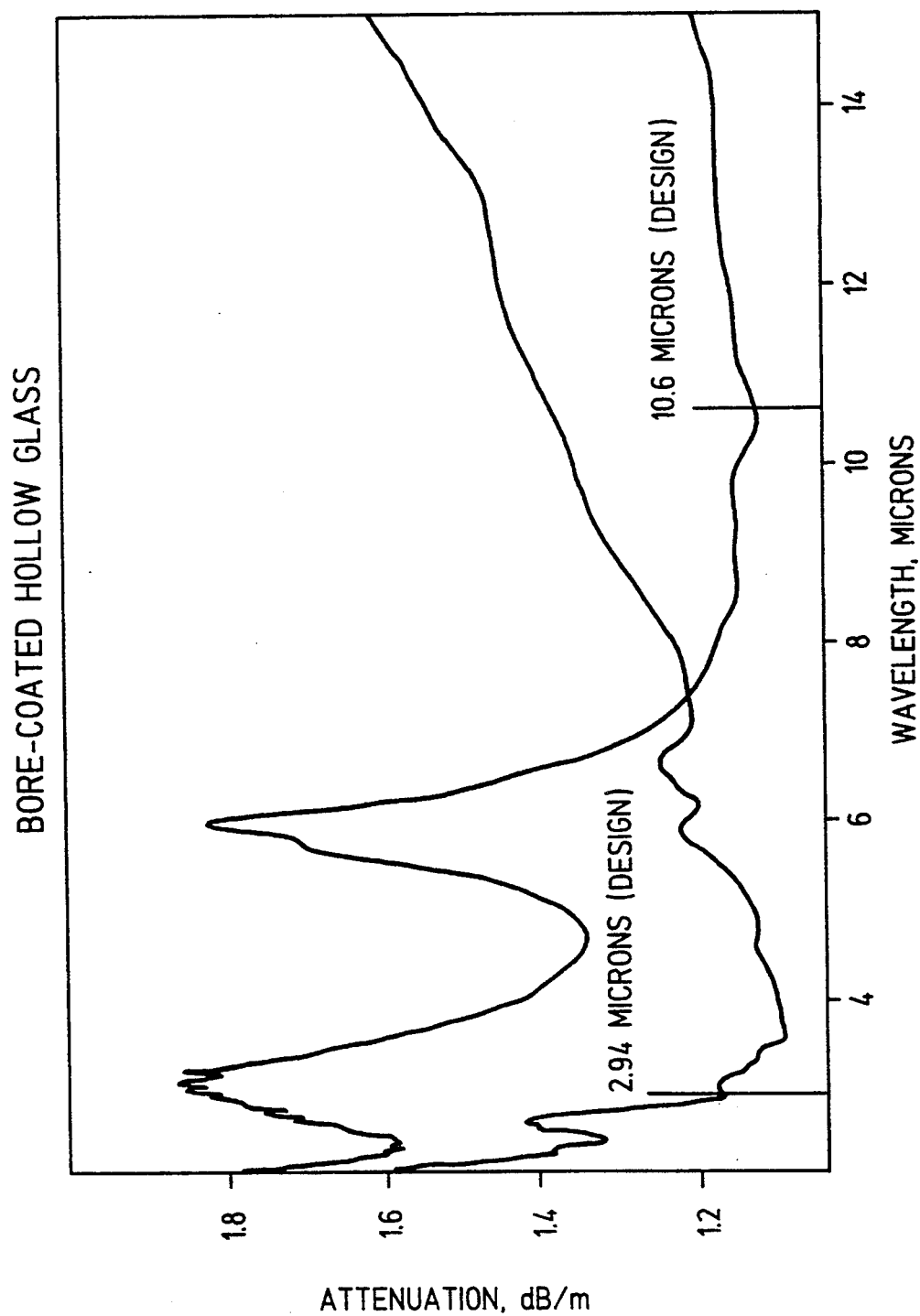
FIG. 2 is a graph of the spectral response of fibers, constructed according to the present invention, for two different design wavelengths.
Figure 3:
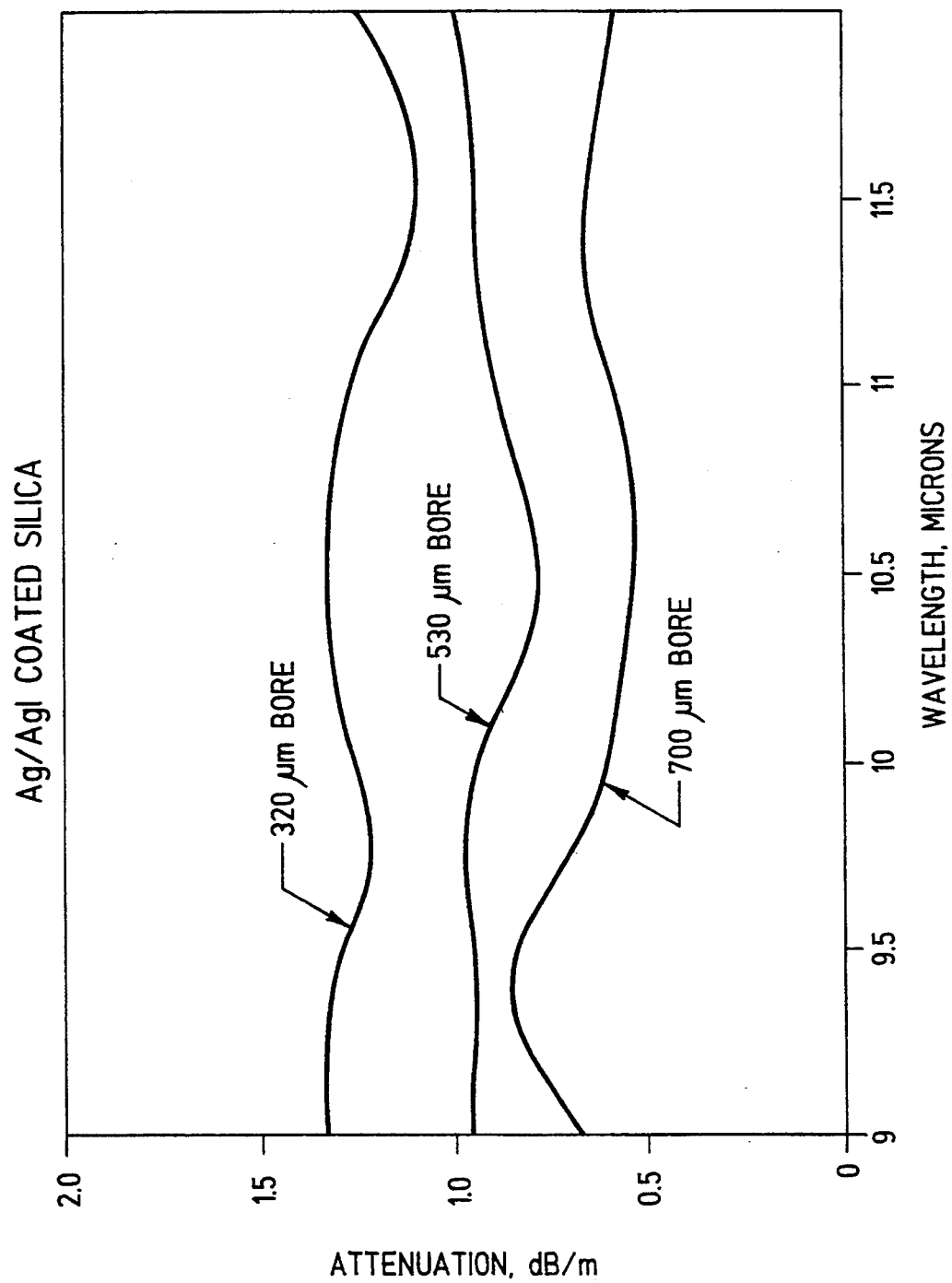
FIG. 3 is a graph of the spectral interference effects for several different fibers constructed according to the present invention.
Figure 8:
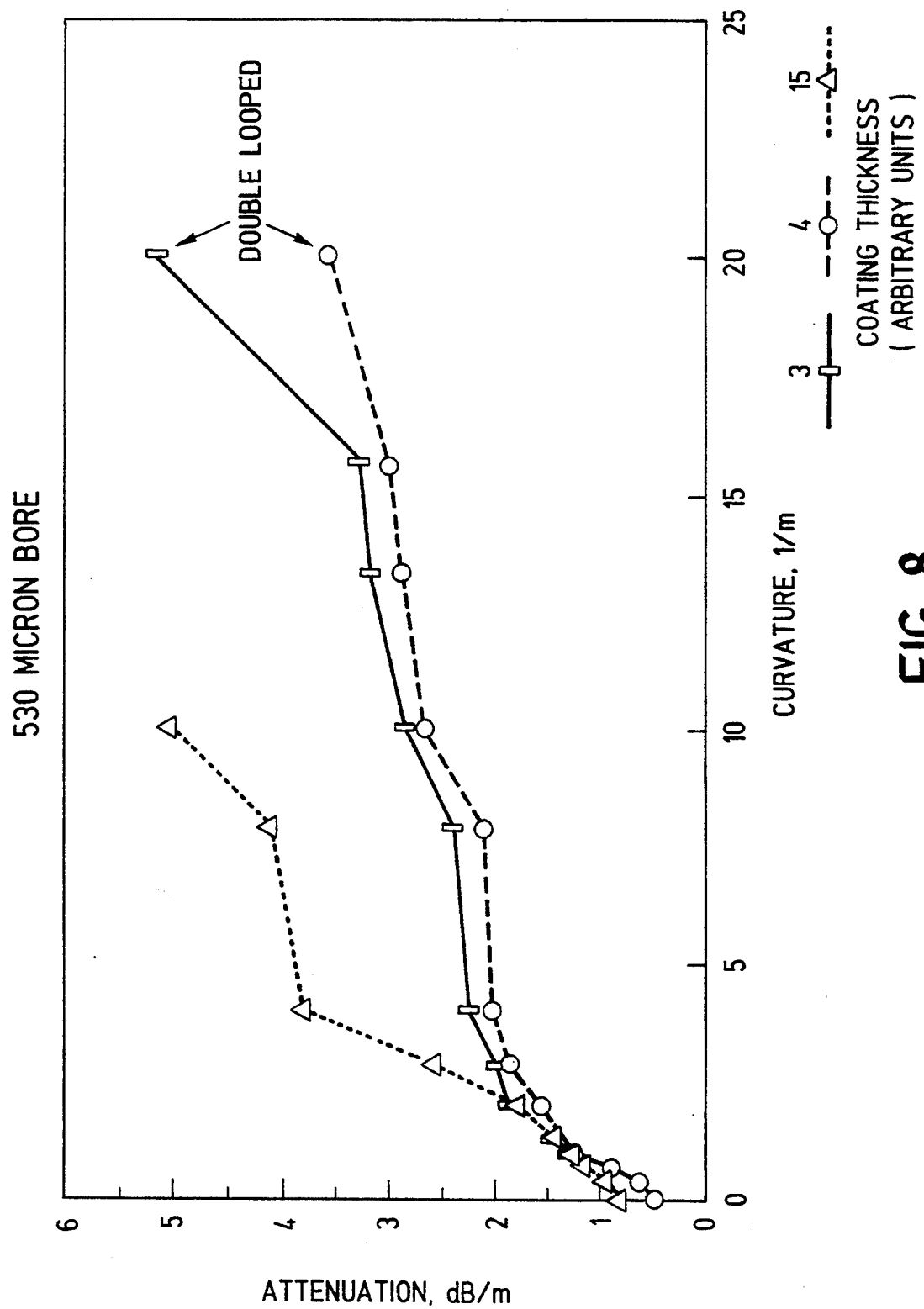
FIG. 8 is a graph illustrating the importance of optimizing and controlling the thickness of the dielectric film, for fibers constructed according to the present invention.

FIGS. 2, 3, and 8 show how the loss is minimized for a chosen spectral region by determining and providing the optimal dielectric film thickness according to the present invention. Proper control of the dielectric film thickness is important to minimizing loss. The present invention allows the thickness of the dielectric film 5 to be precisely controlled, even in small bore fibers.

Figure 4:
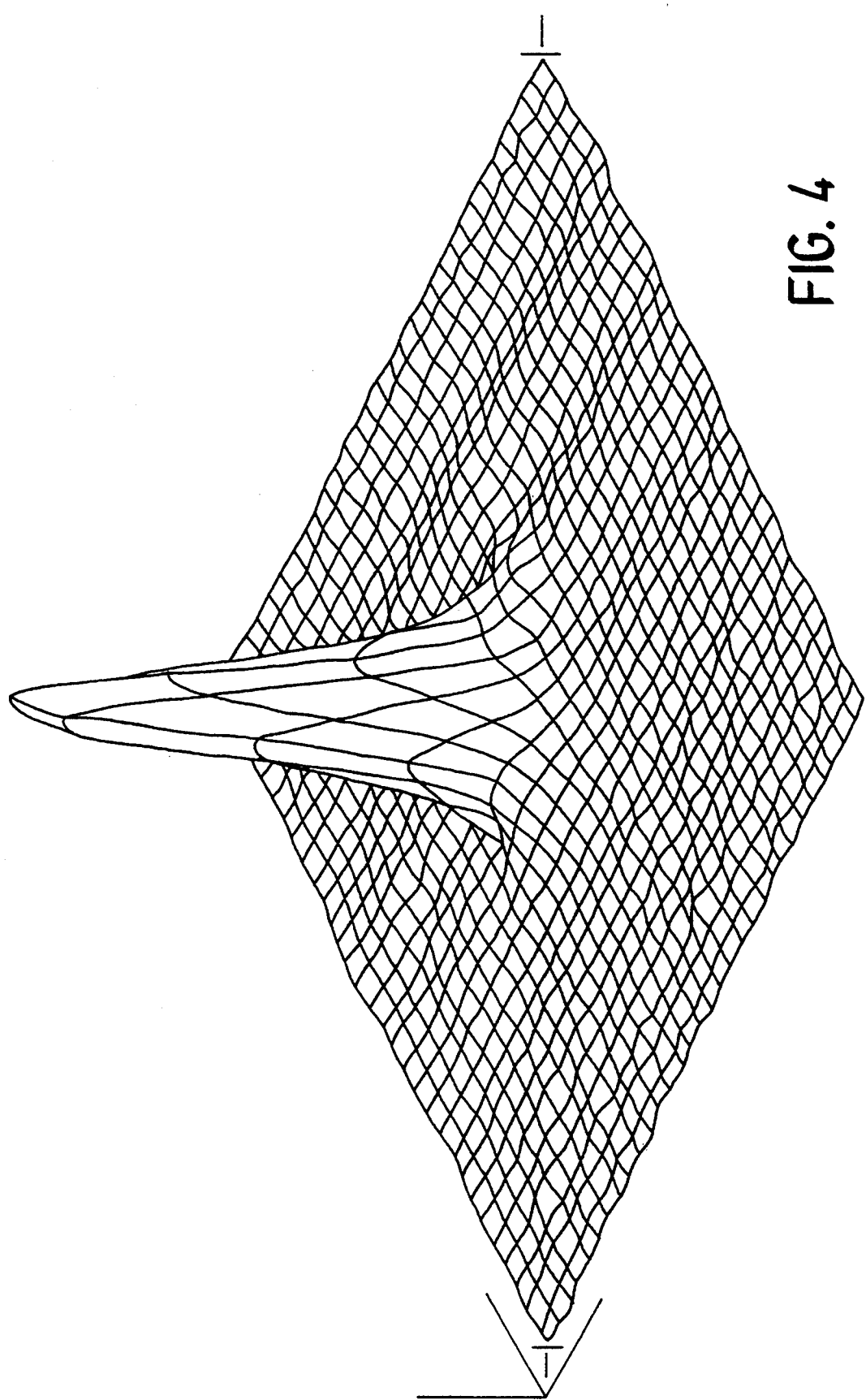
FIG. 4 is a graph of the three-dimensional projection of the spatial profile of the power output from a fiber, constructed according to the present invention, the input of which is correctly illuminated with a $CO_2$ laser.

FIG. 4 demonstrates the excellent mode behavior of waveguides constructed according to the present invention. The output is essentially the same as FIGS. 12A and 13 of Gregory & Harrington (1993), showing that the present method of fabrication does not result in a degraded bore surface. The hollow-fiber waveguides of the present invention are the only such guides with $n > 1$ that do not cause mode-mixing (when initially mode-matched) and consequent multimode output together with excessive bending loss and with substantial changes in output profile as the radius of curvature changes. The importance of the smoothness of the waveguide bore is not taught in the prior art, and such smoothness was not previously attainable.

Figure 5:
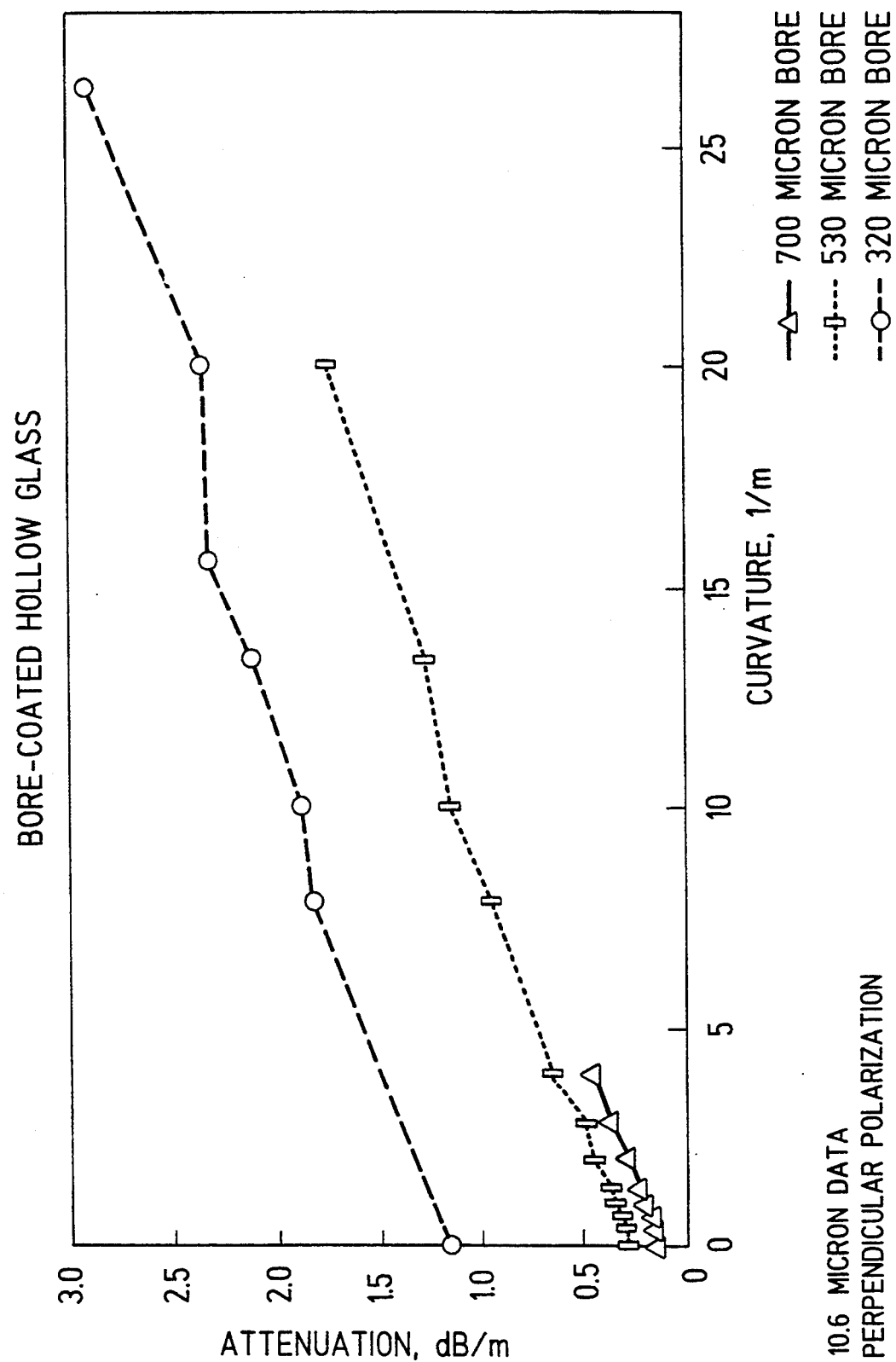
FIG. 5 is a graph of the performance vs. bending of several fibers, of differing bore sizes, constructed according to the present invention.
Figure 6:
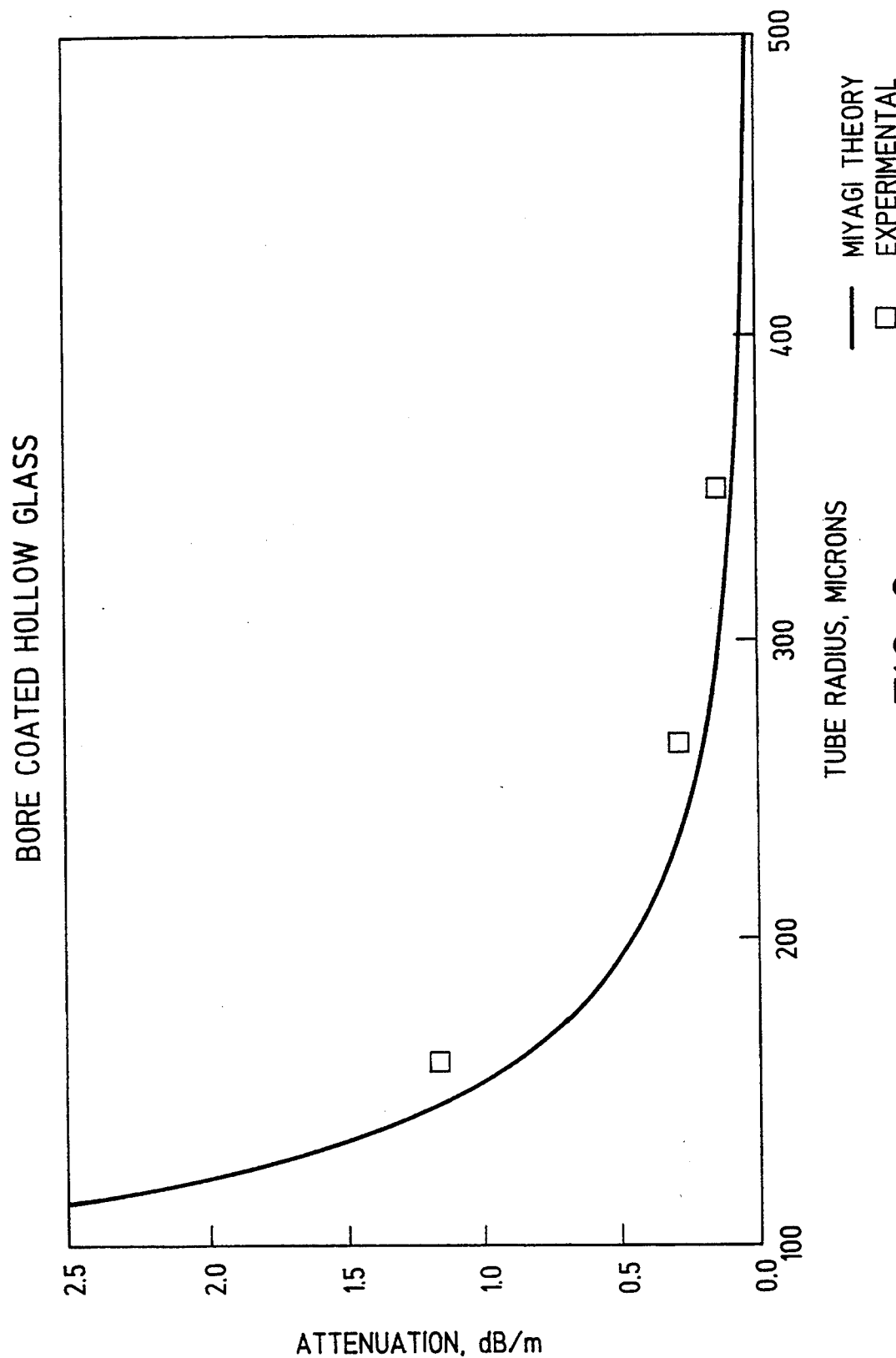
FIG. 6 is a graph illustrating how closely fibers constructed according to the present invention, approach the theoretical limit of performance.

FIGS. 5 and 6 demonstrate that the waveguides constructed according to the present invention exhibit attenuation near the theoretical limit. For comparison, waveguides constructed according to prior art techniques, such as the teachings of Croitoru et al. '863, are inferior by approximately 300 times.

Figure 7:
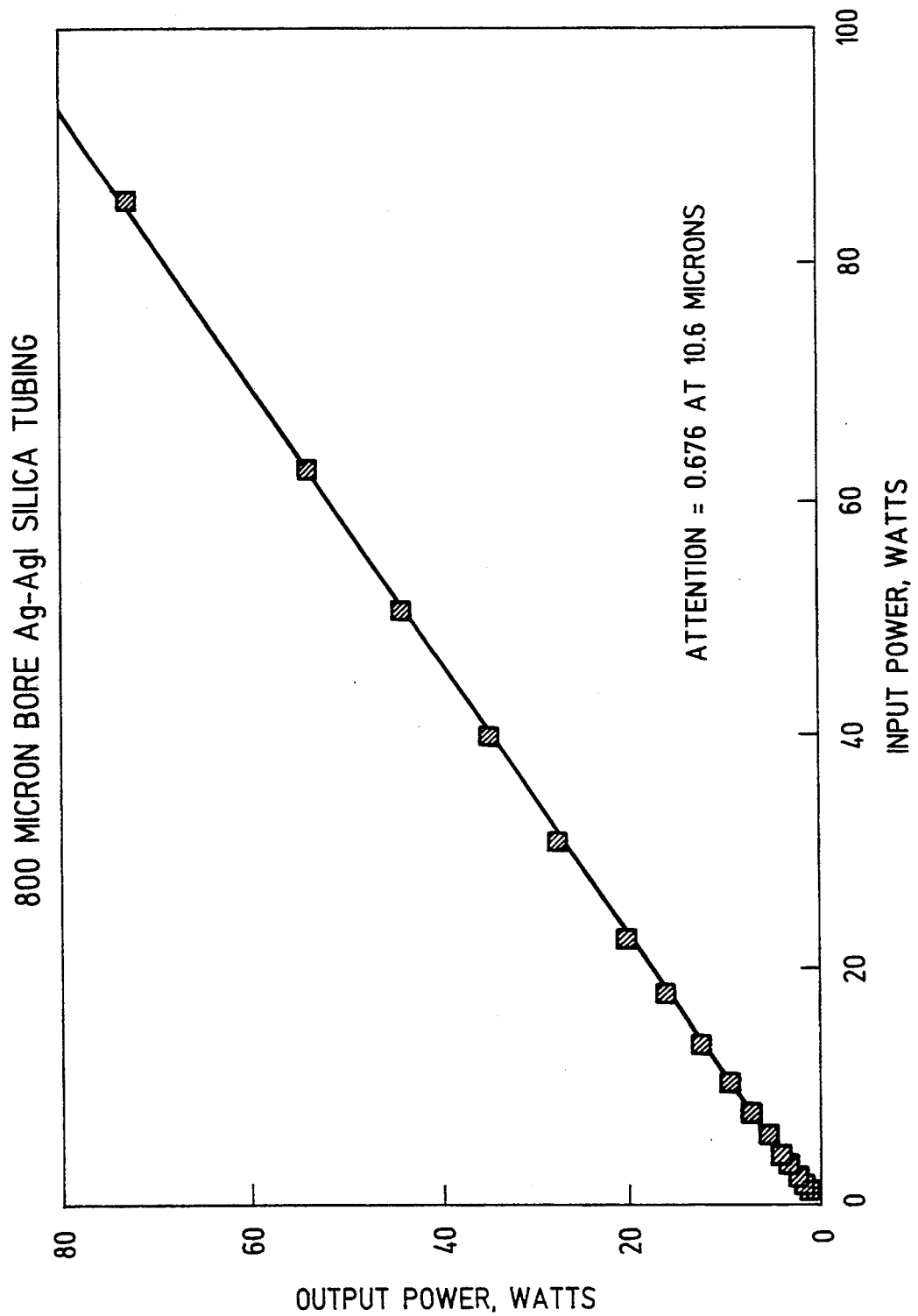
FIG. 7 is a graph illustrating the power-handling capability of a fiber constructed according to the present invention.

FIGS. 5 and 8 demonstrate the good flexibility and the low bending loss, and FIG. 7 demonstrates the power-handling capability, of waveguides 1 fabricated according to the present invention. Waveguides in accordance with the present invention have been measured to have losses as low as 0.1 dB/m for the 700-$\mu$m bore fibers and near single mode output. Waveguides in accordance with the present invention having inner diameters near 500-$\mu$m have losses as low as 0.3 dB/m when used with 9 $\mu$m lines of the $CO_2$ laser. At the Er:YAG laser wavelength of 2.94 $\mu$m, the loss is above 0.3 dB/m for waveguides having approximately a 700-$\mu$m inner diameter. A bend radius as small as 5 centimeters for a 500-$\mu$m bore is possible with a loss of only approximately 1.7 dB/m. The hollow glass waveguides of the present invention are about 275 times lower loss than a comparable prior art waveguide, such as is taught by Croitoru using plastic guides in U.S. Pat. No. 4,930,863. This is due, at least in part, to the ability of the present invention to maintain a very smooth exposed interior surface for the reflective layer 4 and the dielectric film 5. This results in low scattering loss and minimal mode conversion. The low loss of the present invention is also due in part to the fact that the dielectric thickness is carefully controlled. Further, no changes have been observed in their characteristics with time, and at least one such fiber performed well after hospital-grade sterilization with ethylene oxide. Rougher surfaces lead to higher loss, especially on bending. Furthermore, the present invention is rugged and can withstand substantial powers compared to the prior art plastic fibers, which can easily melt when transmitting powers over approximately 20 watts.

The present invention provides a simple structure which is fabricated using straightforward solution chemistry, and inexpensive flexible glass tubing. The present invention differs from the prior art in that the losses are very low due to the exceptional smoothness of the exposed inner surface of the bore of the waveguide of the present invention. The present invention also maintains a very high degree of flexibility, good transverse spatial coherence, and is non-toxic.

A number of embodiments of the present invention have been described. Nevertheless, it will be understood that various modifications may be made without departing from the spirit and scope of the invention. For example, a waveguide in accordance with one embodiment of the present invention has a protective outer coating or sheath about the barrel. In such an embodiment, the coming or sheath may be bonded to the waveguide. However, the waveguide of the present invention may alternatively be removably inserted into such a sheath. In another embodiment, the waveguide may be protected by a covering (commonly known as "heat-shrink tubing") which conforms to the outer surface of the waveguide upon an application of heat thereto. Furthermore, in applications in which the waveguide is used for a very limited time, such as medical applications, the waveguide may not be protected by any such coating. Any means for applying metal smoothly to the inner exposed surface of a hollow fiber can be used to fabricate the waveguide of the present invention. Also, the solution that is used to deposit the reflective layer may be any reflective material, including metal alloys which include only one single metal. Furthermore, while the above description of the examples of the present invention focuses on the use of silver as the material used to fabricate the reflective layer, any material having a high reflectivity and capable of being smoothly deposited on the exposed inner surface of the bore of a hollow fiber by flowing the material though the bore is within the scope of the present invention. Furthermore, any dielectric which has an appropriate index of refraction and which can be deposited on the exposed surface of the reflective layer is within the scope of the present invention.

Accordingly, it is to be understood that the invention is not to be limited by the specific illustrated embodiment, but only by the scope of the appended claims.

We claim:

1. A waveguide for transmitting mid-infrared electromagnetic radiation, comprising:
    (a) a hollow flexible tube having a bore less than approximately 1.0 mm in diameter and having a smooth bore surface;
    (b) a reflective layer disposed upon the surface of the bore by placing a solution in contact with the bore surface, the exposed surface of which is approximately as smooth as the surface of the bore; and
    (c) a dielectric film formed upon the exposed smooth surface of the reflective layer, the thickness of which is selected for a particular wavelength of mid-infrared radiation, and having an exposed surface approximately as smooth as the surface of the reflective layer.

2. The waveguide of claim 1 wherein the dielectric film has an index of refraction that is less than the index of refraction of the reflective layer.

3. A waveguide for transmitting mid-infrared electromagnetic radiation, comprising a smooth internal surface substrate having a bore, a reflective layer disposed upon the surface of the bore, the exposed surface of which is approximately as smooth as the surface of the bore, a dielectric film disposed upon the exposed smooth surface of the reflective layer, the thickness of which is selected for a particular wavelength of mid-infrared radiation, and wherein the diameter of the bore is less than 1.0 millimeter, produced by a method including the steps of:
    (a) propelling a first solution including a reflective material through the smooth internal surface substrate by creating a pressure differential between a first end of the bore and a second end of the bore such that a film of reflective material is deposited on the surface of the bore; and
    (b) propelling a second solution through the smooth internal surface substrate by creating a pressure differential between the first end of the bore and a second end of the bore such that a film of dielectric material is created upon the exposed surface of the film of reflective material, the thickness of which is controllable.

4. A waveguide for transmitting mid-infrared electromagnetic radiation in a near Gaussian mode with a loss of less than 1 dB/m at a wavelength of 9–11 $\mu$m with approximately infinite radius of curvature, and with a loss of less than 1.5 dB/m at a wavelength of 9–11 $\mu$m with a radius of curvature of approximately 10 cm produced by a method including the following steps:
    (a) propelling a first solution of reflective material through the smooth internal surface substrate by creating a pressure differential between a first end of the bore and a second end of the bore such that a film of reflective material is deposited on the surface of the bore; and
    (b) propelling a second solution through the smooth internal surface substrate by creating a pressure differential between the first end of the bore and a second end of the bore such that a film of dielectric material is created upon the exposed surface of the film of reflective material, the thickness of which is controllable.

5. A waveguide for transmitting mid-infrared electromagnetic radiation in a near Gaussian mode with a loss of less than 1 dB/m at a wavelength of 3 $\mu$m with approximately infinite radius of curvature, and with a loss of less than 1.5 dB/m at a wavelength of 3 $\mu$m with a radius of curvature of approximately 10 cm produced by a method including the following steps:
    (a) propelling a first solution of reflective material through the smooth internal surface substrate by creating a pressure differential between a first end of the bore and a second end of the bore such that a film of reflective material is deposited on the surface of the bore; and
    (b) propelling a second solution through the smooth internal surface substrate by creating a pressure differential between the first end of the bore and a second end of the bore such that a film of dielectric material is created upon the exposed surface of the film of reflective material, the thickness of which is controllable.

6. A waveguide for transmitting mid-infrared electromagnetic radiation, comprising a smooth internal surface substrate having a bore, a reflective layer disposed upon the surface of the bore, the exposed surface of which is approximately as smooth as the surface of the bore, a dielectric film formed upon the exposed smooth surface of the reflective layer, the thickness of which is selected for a particular wavelength of mid-infrared radiation wherein the diameter of the bore is less than 2.5 millimeters, produced by a method including the following steps:
    (a) plating a smooth internal surface substrate with a reflective layer by contacting the bore surface with a solution;
    (b) forming a dielectric film upon the reflective layer.

7. A waveguide for transmitting mid-infrared electromagnetic radiation in a near Gaussian mode with a loss of less than 1 dB/m at a wavelength of 9–11 $\mu$m with approximately infinite radius of curvature, and with a loss of less than 1.5 dB/m at a wavelength of 9–11 $\mu$m with a radius of curvature of approximately 10 cm produced by a method including the following steps:
    (a) plating a smooth internal surface substrate with a reflective layer by contacting the bore surface with a solution;
    (b) depositing a dielectric film upon the reflective layer.

8. A waveguide for transmitting mid-infrared electromagnetic radiation in a near Gaussian mode with a loss of less than 1 dB/m at a wavelength of 3 $\mu$m with approximately infinite radius of curvature, and with a loss of less than 1.5 dB/m at a wavelength of 3 $\mu$m with a radius of curvature of approximately 10 cm produced by a method including the following steps:
    (a) plating a smooth internal surface substrate with a reflective layer by contacting the bore surface with a solution;
    (b) depositing a dielectric film upon the reflective layer.

* * * * *

UNITED STATES PATENT AND TRADEMARK OFFICE
CERTIFICATE OF CORRECTION

PATENT NO.  : 5,440,664
DATED       : August 8, 1995
INVENTOR(S) : James A. Harrington, Todd C. Abel and Jeffery Hirsch It is certified that error appears in the above-indentified patent and that said Letters Patent is hereby corrected as shown below:

In column 1, after the title of the application on line 3, please insert the following:

--The U.S. Government has a paid-up license in this invention and the right in limited circumstances to require the patent owner to license others on reasonable terms as provided for by the terms of Grant No. DAAB07-92-C-J30 awarded by the U.S. Department of the Army, CECOM.--

Signed and Sealed this

Eighteenth Day of June, 1996

Attest:

BRUCE LEHMAN

*Attesting Officer*   *Commissioner of Patents and Trademarks*